United States Patent
Loomba et al.

(10) Patent No.: US 11,047,753 B2
(45) Date of Patent: Jun. 29, 2021

(54) PRESSURE SENSOR ASSEMBLY AND METHOD FOR MANUFACTURING A PRESSURE SENSOR ASSEMBLY

(71) Applicant: Therm-O-Disc, Incorporated, Mansfield, OH (US)

(72) Inventors: Indra J. Loomba, Spring Lake, MI (US); Chunming Li, Zhongshan (CN); HaiJian Liang, Shenzhen (CN); Zhouyu Zhao, Shenzhen (CN); Dong Peng, Zhongshan (CN); Amy Hertel, Rothbury, MI (US)

(73) Assignee: Therm-O-Disc, Incorporated, Mansfield, OH (US)

(*) Notice: Subject to any disclaimer, the term of this patent is extended or adjusted under 35 U.S.C. 154(b) by 122 days.

(21) Appl. No.: 16/518,466

(22) Filed: Jul. 22, 2019

(65) Prior Publication Data

US 2020/0209091 A1 Jul. 2, 2020

(30) Foreign Application Priority Data

Dec. 27, 2018 (CN) .......................... 201822213406.4

(51) Int. Cl.
*G01L 19/00* (2006.01)
*G01L 9/06* (2006.01)
*G01L 19/06* (2006.01)

(52) U.S. Cl.
CPC ............ *G01L 19/0069* (2013.01); *G01L 9/06* (2013.01); *G01L 19/0038* (2013.01); *G01L 19/0645* (2013.01)

(58) Field of Classification Search
CPC ... G01L 19/0069; G01L 9/06; G01L 19/0038; G01L 19/0645; G01L 19/14;
(Continued)

(56) References Cited

U.S. PATENT DOCUMENTS 5,959,212 A 9/1999 Sogge et al.
5,974,893 A 11/1999 Balcarek et al.
(Continued)

FOREIGN PATENT DOCUMENTS

CN 205785644 U 12/2016
CN 105236343 B 7/2017
(Continued)

OTHER PUBLICATIONS

60 CP Series | Ceramic Capacitive Pressure Sensor—5VDC Supply, Ratiometric Output, Copyright © 2017 Sensata Technologies, Inc.
(Continued)

*Primary Examiner* — Benjamin R Schmitt
(74) *Attorney, Agent, or Firm* — Harness, Dickey & Pierce, P.L.C.

(57) ABSTRACT

A pressure sensor assembly and method for manufacturing a pressure sensor assembly is disclosed and includes a pressure responsive component having a pressure sensitive element and an output signal generator disposed on a common substrate. The substrate has an aperture extending completely there through and the pressure sensitive element is disposed in communication with the aperture. The aperture is open to the ambient environment. The pressure responsive component is received in a connector which is received in a housing. Multiple seal structures isolate the pressure responsive component within the housing.

19 Claims, 6 Drawing Sheets

(58) Field of Classification Search
CPC ... G01L 19/142; G01L 19/143; G01L 19/147; G01L 19/148
See application file for complete search history.

(56) References Cited

U.S. PATENT DOCUMENTS

| | | | |
|---|---|---|---|
| 6,105,437 A | 8/2000 | Klug et al. |
| 6,144,866 A | 11/2000 | Miesel et al. |
| 6,229,190 B1 | 5/2001 | Bryzek et al. |
| 6,255,728 B1 | 7/2001 | Nasiri et al. |
| 6,263,739 B1 | 7/2001 | Seefried et al. |
| 6,272,927 B1 | 8/2001 | Amatruda et al. |
| 6,272,928 B1 | 8/2001 | Kurtz |
| 6,314,816 B1 | 11/2001 | Wiegand |
| 6,420,201 B1 | 7/2002 | Webster |
| 6,422,085 B1 | 7/2002 | Hegner et al. |
| 6,432,737 B1 | 8/2002 | Webster |
| 6,441,503 B1 | 8/2002 | Webster |
| 6,453,747 B1 | 9/2002 | Weise et al. |
| 6,474,168 B1 | 11/2002 | Meringdal |
| 6,487,911 B1 | 12/2002 | Frackelton et al. |
| 6,505,398 B2 | 1/2003 | Park |
| 6,564,642 B1 | 5/2003 | Clifford |
| 6,568,265 B2 | 5/2003 | Shibue et al. |
| 6,578,427 B1 | 6/2003 | Hegner |
| 6,581,468 B2 | 6/2003 | Clifford |
| 6,584,853 B2 | 7/2003 | Park et al. |
| 6,601,453 B2 | 8/2003 | Miyazaki et al. |
| 6,626,045 B2 | 9/2003 | Krumpolz et al. |
| 6,647,794 B1 | 11/2003 | Nelson et al. |
| 6,672,170 B1 | 1/2004 | DiPaola |
| 6,672,171 B2 | 1/2004 | Gu et al. |
| 6,684,712 B2 | 2/2004 | Klein et al. |
| 6,687,642 B2 | 2/2004 | Maher et al. |
| 6,688,182 B2 | 2/2004 | Kurtz et al. |
| 6,715,356 B2 | 4/2004 | Gerst et al. |
| 6,715,357 B2 | 4/2004 | Ishiguro et al. |
| 6,742,395 B1 | 6/2004 | Borgers et al. |
| 6,776,046 B2 | 8/2004 | Pistorius |
| 6,781,814 B1 | 8/2004 | Greene |
| 6,806,722 B2 | 10/2004 | Shon et al. |
| 6,845,674 B2 | 1/2005 | Becker et al. |
| 6,882,165 B2 | 4/2005 | Ogura |
| 6,883,379 B2 | 4/2005 | Kaneko et al. |
| 6,907,790 B2 | 6/2005 | Orth et al. |
| 6,923,069 B1 | 8/2005 | Stewart |
| 6,931,935 B2 | 8/2005 | Blomberg |
| 6,973,836 B2 | 12/2005 | Katsumata et al. |
| 6,978,678 B2 | 12/2005 | Lohmeier et al. |
| 7,000,478 B1 | 2/2006 | Zwollo et al. |
| 7,007,552 B2 | 3/2006 | Weise et al. |
| 7,013,735 B2 | 3/2006 | Miyazawa |
| 7,028,551 B2 | 4/2006 | Park et al. |
| 7,030,630 B2 | 4/2006 | Haas et al. |
| 7,031,863 B2 | 4/2006 | Maher et al. |
| 7,032,448 B2 | 4/2006 | Hamamoto |
| 7,049,829 B2 | 5/2006 | Luthi |
| 7,057,247 B2 | 6/2006 | Kurtz et al. |
| 7,073,375 B2 | 7/2006 | Parker et al. |
| 7,111,518 B1 | 9/2006 | Allen et al. |
| 7,140,256 B2 | 11/2006 | Flogel et al. |
| 7,150,194 B2 | 12/2006 | Pepperling et al. |
| 7,162,925 B2 | 1/2007 | Dietrich |
| 7,162,926 B1 | 1/2007 | Guziak et al. |
| D543,476 S | 5/2007 | Barmettler et al. |
| 7,210,333 B2 | 5/2007 | Fujita et al. |
| 7,213,462 B2 | 5/2007 | Watanabe |
| 7,222,531 B2 | 5/2007 | Isogai et al. |
| 7,231,815 B2 | 6/2007 | Kanare |
| D545,707 S | 7/2007 | Barmettler et al. |
| 7,243,550 B2 | 7/2007 | Dannhauer et al. |
| 7,243,552 B2 | 7/2007 | Vas et al. |
| 7,246,525 B2 | 7/2007 | Birkelund et al. |
| 7,278,318 B2 | 10/2007 | Dannhauer et al. |
| 7,284,440 B2 | 10/2007 | Kurtz et al. |
| 7,290,453 B2 | 11/2007 | Brosh |
| D559,716 S | 1/2008 | Barmettler et al. |
| 7,332,995 B2 | 2/2008 | Arisaka |
| 7,337,657 B2 | 3/2008 | Haussner et al. |
| 7,355,718 B2 | 4/2008 | Craft et al. |
| 7,380,459 B1 | 6/2008 | Sapir |
| 7,389,697 B2 | 6/2008 | Jonsson |
| 7,395,718 B2 | 7/2008 | Obermeier |
| 7,418,873 B2 | 9/2008 | Takada |
| 7,426,868 B2 | 9/2008 | Fessele et al. |
| 7,437,937 B2 | 10/2008 | Becher et al. |
| 7,441,461 B2 | 10/2008 | Muth et al. |
| 7,465,425 B1 | 12/2008 | Sun |
| 7,467,891 B2 | 12/2008 | Gennissen et al. |
| 7,471,093 B2 | 12/2008 | Arisaka |
| 7,487,681 B1 | 2/2009 | Allen |
| 7,493,822 B2 | 2/2009 | Stewart et al. |
| 7,499,604 B1 | 3/2009 | Burns |
| 7,515,039 B2 | 4/2009 | Casey et al. |
| 7,540,196 B2 | 6/2009 | Kurtz et al. |
| 7,578,194 B1 | 8/2009 | Hadjiloucas et al. |
| 7,597,005 B2 | 10/2009 | McMonigal |
| 7,635,091 B2 | 12/2009 | Engler et al. |
| 7,644,615 B2 | 1/2010 | Arisaka |
| 7,673,518 B2 | 3/2010 | Kurtz |
| 7,677,108 B2 | 3/2010 | Kim |
| 7,683,636 B2 | 3/2010 | Alimi et al. |
| 7,698,950 B2 | 4/2010 | Kraatz |
| 7,698,951 B2 | 4/2010 | Brown et al. |
| 7,741,950 B2 | 6/2010 | Ehrhorn |
| 7,762,140 B2 | 7/2010 | Girroir et al. |
| 7,775,118 B2 | 8/2010 | Casey et al. |
| 7,775,119 B1 | 8/2010 | Suminto et al. |
| 7,779,701 B2 | 8/2010 | DiPaolo et al. |
| 7,819,014 B1 | 10/2010 | Broden |
| 7,827,867 B2 | 11/2010 | Leiderer |
| 7,866,215 B2 | 1/2011 | Kurtz |
| 7,895,897 B2 | 3/2011 | Kraatz |
| 7,924,028 B2 | 4/2011 | Alimi et al. |
| 7,967,965 B2 | 6/2011 | Jones |
| 7,971,482 B2 | 7/2011 | Isogai et al. |
| 7,974,503 B2 | 7/2011 | Huang et al. |
| 7,992,441 B2 | 8/2011 | Mulligan et al. |
| 7,998,777 B1 | 8/2011 | Gamage et al. |
| 8,020,448 B2 | 9/2011 | Schlag |
| 8,020,450 B2 | 9/2011 | Landwehr et al. |
| 8,024,970 B2 | 9/2011 | Zhang |
| 8,024,976 B2 | 9/2011 | Kurtz et al. |
| 8,030,990 B2 | 10/2011 | Rossner et al. |
| 8,069,729 B2 | 12/2011 | Dannhauer et al. |
| 8,082,807 B2 | 12/2011 | Casey et al. |
| 8,100,022 B2 | 1/2012 | Choisnet |
| 8,104,353 B2 | 1/2012 | Drewes et al. |
| 8,132,457 B2 | 3/2012 | Haji-Sheikh et al. |
| 8,176,791 B2 | 5/2012 | Hegner et al. |
| 8,186,226 B2 | 5/2012 | Ricks |
| 8,215,176 B2 | 7/2012 | Ding et al. |
| 8,217,475 B2 | 7/2012 | Seesink et al. |
| 8,234,926 B2 | 8/2012 | Wohlgemuth et al. |
| 8,235,592 B2 | 8/2012 | Brautlgam et al. |
| 8,236,164 B2 | 8/2012 | Gustafsson et al. |
| 8,256,300 B2 | 9/2012 | Willner et al. |
| 8,264,074 B2 | 9/2012 | Kim et al. |
| 8,276,457 B2 | 10/2012 | Philipps |
| 8,297,115 B2 | 10/2012 | Borgers et al. |
| 8,324,913 B2 | 12/2012 | Lehmann et al. |
| 8,327,714 B2 | 12/2012 | Barmettler et al. |
| 8,365,607 B2 | 2/2013 | Mitchell et al. |
| 8,371,160 B2 | 2/2013 | Kwa et al. |
| 8,393,223 B2 | 3/2013 | Delapierre et al. |
| 8,429,956 B2 | 4/2013 | Borgers et al. |
| 8,429,977 B2 | 4/2013 | Ahles et al. |
| 8,485,041 B2 | 7/2013 | Ahles et al. |
| 8,490,494 B2 | 7/2013 | Parrotto et al. |
| 8,492,855 B2 | 7/2013 | Lammel et al. |
| 8,499,642 B2 | 8/2013 | Hopman et al. |
| 8,528,409 B2 | 9/2013 | Eswaran et al. |
| 8,530,261 B2 | 9/2013 | Kramer et al. |
| 8,535,853 B2 | 9/2013 | Naydenova et al. |

(56) References Cited

U.S. PATENT DOCUMENTS

| | | |
|---|---|---|
| 8,567,254 B2 | 10/2013 | Teli et al. |
| 8,573,052 B2 | 11/2013 | Hong et al. |
| 8,590,387 B2 | 11/2013 | Crivelli |
| 8,616,065 B2 | 12/2013 | Stewart et al. |
| 8,618,620 B2 | 12/2013 | Winkler et al. |
| 8,621,923 B2 | 1/2014 | Frerichs |
| 8,631,708 B2 | 1/2014 | Crivelli |
| 8,643,127 B2 | 2/2014 | Dangtran et al. |
| 8,643,387 B2 | 2/2014 | McFarlane et al. |
| 8,648,395 B2 | 2/2014 | Cummins |
| 8,661,910 B2 | 3/2014 | McLaughlin et al. |
| 8,671,969 B2 | 3/2014 | Dresselhaus et al. |
| 8,707,774 B2 | 4/2014 | Krommenhoek et al. |
| 8,739,622 B2 | 6/2014 | Grange et al. |
| 8,739,623 B2 | 6/2014 | Chen et al. |
| 8,763,466 B2 | 7/2014 | Wosnitza et al. |
| 8,770,009 B2 | 7/2014 | Tiek et al. |
| 8,770,032 B2 | 7/2014 | Krusemark et al. |
| 8,770,034 B2 | 7/2014 | Bentley et al. |
| 8,776,597 B2 | 7/2014 | Waga et al. |
| 8,779,781 B2 | 7/2014 | Nguyen et al. |
| 8,783,101 B2 | 7/2014 | Zhang et al. |
| 8,794,077 B2 | 8/2014 | Philipps |
| 8,800,474 B2 | 8/2014 | Wacker et al. |
| 8,813,562 B2 | 8/2014 | Prud'Homme |
| 8,820,170 B2 | 9/2014 | Slakhorst et al. |
| 8,869,596 B2 | 10/2014 | Hagl |
| 8,878,313 B2 | 11/2014 | Salmaso |
| 8,878,316 B2 | 11/2014 | Ding |
| 8,902,604 B2 | 12/2014 | Zoellin et al. |
| 8,935,961 B2 | 1/2015 | Papadeas et al. |
| 8,950,247 B2 | 2/2015 | Borgers et al. |
| D724,981 S | 3/2015 | Schreiber et al. |
| 8,973,423 B2 | 3/2015 | Heckler et al. |
| 9,007,050 B2 | 4/2015 | Hill |
| 9,018,963 B2 | 4/2015 | Sim et al. |
| 9,027,400 B2 | 5/2015 | Le Neel et al. |
| 9,027,410 B2 | 5/2015 | Hop et al. |
| 9,063,031 B2 | 6/2015 | Zwollo et al. |
| 9,116,060 B2 | 8/2015 | Ashman et al. |
| 9,116,074 B2 | 8/2015 | Berkel et al. |
| 9,134,281 B2 | 9/2015 | Grange |
| 9,146,164 B2 | 9/2015 | Hopman et al. |
| 9,157,821 B2 | 10/2015 | Robert et al. |
| 9,234,859 B2 | 1/2016 | Vaiana et al. |
| 9,239,308 B2 | 1/2016 | Tondokoro et al. |
| 9,239,309 B2 | 1/2016 | Niimi et al. |
| 9,285,334 B2 | 3/2016 | Chen |
| 9,291,514 B2 | 3/2016 | Wohlgemuth |
| 9,304,098 B2 | 4/2016 | Pion |
| 9,310,266 B2 | 4/2016 | Petrarca |
| 9,310,269 B2 | 4/2016 | Visser et al. |
| 9,340,414 B2 | 5/2016 | Yoneoka et al. |
| 9,371,220 B2 | 6/2016 | Ludwig et al. |
| 9,383,283 B2 | 7/2016 | Nassar et al. |
| 9,401,601 B2 | 7/2016 | Wolf et al. |
| 9,423,315 B2 | 8/2016 | Fahimi et al. |
| 9,470,593 B2 | 10/2016 | Davis et al. |
| 9,470,594 B2 | 10/2016 | Cornwell et al. |
| 9,470,773 B2 | 10/2016 | Uehlin et al. |
| 9,494,477 B2 | 11/2016 | Wiesbauer et al. |
| 9,494,538 B2 | 11/2016 | Kozicki et al. |
| 9,500,125 B2 | 11/2016 | Groenhuijzen et al. |
| 9,513,242 B2 | 12/2016 | Beck et al. |
| 9,513,245 B2 | 12/2016 | Sakai et al. |
| 9,546,922 B2 | 1/2017 | Ding |
| 9,557,237 B2 | 1/2017 | McNeal et al. |
| 9,557,238 B2 | 1/2017 | Besling et al. |
| 9,562,796 B2 | 2/2017 | Lull |
| 9,562,838 B2 | 2/2017 | Bloecher et al. |
| 9,562,872 B2 | 2/2017 | Gryska et al. |
| 9,568,384 B1 | 2/2017 | Stith, Jr. |
| 9,568,388 B2 | 2/2017 | Bousquet et al. |
| 9,574,961 B2 | 2/2017 | Ding et al. |
| 9,594,041 B2 | 3/2017 | Koo et al. |
| 9,599,583 B2 | 3/2017 | Gryska et al. |
| 9,611,821 B2 | 4/2017 | Smith |
| 9,618,469 B2 | 4/2017 | Scott et al. |
| 9,625,335 B2 | 4/2017 | Berlinger et al. |
| 9,638,559 B1 | 5/2017 | Zummo et al. |
| 9,664,630 B2 | 5/2017 | Yoon et al. |
| 9,671,359 B2 | 6/2017 | Kotnala et al. |
| 9,702,740 B2 | 7/2017 | Breunig et al. |
| 9,709,461 B2 | 7/2017 | Lenferink et al. |
| 9,714,876 B2 | 7/2017 | Huo et al. |
| 9,746,390 B2 | 8/2017 | Schoot Uiterkamp et al. |
| 9,746,438 B2 | 8/2017 | Pion |
| 9,752,999 B2 | 9/2017 | Kalinichev et al. |
| 9,753,430 B2 | 9/2017 | Zheng et al. |
| 9,766,145 B2 | 9/2017 | Deane et al. |
| 9,778,126 B2 | 10/2017 | Kurtz |
| 9,780,554 B2 | 10/2017 | Kardassakis et al. |
| 9,804,048 B2 | 10/2017 | Zhang |
| 9,804,113 B2 | 10/2017 | Kumaran et al. |
| D803,082 S | 11/2017 | Banschbach et al. |
| 9,816,953 B2 | 11/2017 | Franz et al. |
| 9,828,848 B2 | 11/2017 | Coulston |
| 9,846,095 B2 | 12/2017 | Chiou et al. |
| 9,846,135 B2 | 12/2017 | Mayer et al. |
| 9,863,830 B2 | 1/2018 | Drewes et al. |
| 9,903,777 B2 | 2/2018 | Lavado et al. |
| 9,909,947 B2 | 3/2018 | Reuter et al. |
| 9,915,577 B2 | 3/2018 | Strott et al. |
| 9,921,121 B2 | 3/2018 | Glaab et al. |
| 9,952,111 B2 | 4/2018 | Froemel |
| 2005/0166681 A1* | 8/2005 | Onoda ............... G01L 19/143 73/715 |
| 2009/0314096 A1* | 12/2009 | Colombo ........... G01L 19/0092 73/754 |
| 2013/0341420 A1 | 12/2013 | Lister et al. |
| 2015/0059485 A1 | 3/2015 | Haag et al. |
| 2015/0122017 A1 | 5/2015 | Park et al. |
| 2015/0153297 A1 | 6/2015 | Aliane et al. |
| 2015/0316528 A1 | 11/2015 | Schumacher |
| 2015/0369768 A1 | 12/2015 | Sul et al. |
| 2016/0002026 A1 | 1/2016 | Chodavarapu et al. |
| 2016/0003758 A1 | 1/2016 | Hong |
| 2016/0084723 A1 | 3/2016 | Drewes et al. |
| 2016/0084811 A1 | 3/2016 | Viitanen et al. |
| 2016/0097693 A1 | 4/2016 | Sloetjes et al. |
| 2016/0153815 A1 | 6/2016 | Van Der Wiel et al. |
| 2016/0161435 A1 | 6/2016 | Fujimoto et al. |
| 2016/0161443 A1 | 6/2016 | Nakamura |
| 2016/0178553 A1 | 6/2016 | Bommarito et al. |
| 2016/0207762 A1 | 7/2016 | Lu et al. |
| 2016/0231193 A1 | 8/2016 | Haldorsen |
| 2016/0258894 A1 | 9/2016 | Futatsugi |
| 2016/0273989 A1 | 9/2016 | Brida et al. |
| 2016/0290508 A1 | 10/2016 | Gugenberger |
| 2016/0298575 A1 | 10/2016 | Chaput et al. |
| 2016/0299095 A1 | 10/2016 | Serban et al. |
| 2016/0313200 A1 | 10/2016 | Rupp et al. |
| 2016/0327502 A1 | 11/2016 | Chen et al. |
| 2016/0348618 A1 | 12/2016 | Detsch et al. |
| 2016/0349128 A1 | 12/2016 | Kaufmann et al. |
| 2016/0356656 A1 | 12/2016 | Hoshika et al. |
| 2016/0377459 A1 | 12/2016 | Faeth et al. |
| 2017/0037819 A1 | 2/2017 | Hosokawa et al. |
| 2017/0038272 A1 | 2/2017 | Jacobs et al. |
| 2017/0038880 A1 | 2/2017 | Kinzer et al. |
| 2017/0059436 A1 | 3/2017 | Bauer et al. |
| 2017/0074740 A1 | 3/2017 | Lecomte |
| 2017/0082567 A1 | 3/2017 | O'Brien et al. |
| 2017/0089794 A1 | 3/2017 | Schonhardt et al. |
| 2017/0090604 A1 | 3/2017 | Barbier |
| 2017/0097313 A1 | 4/2017 | Serban et al. |
| 2017/0138495 A1 | 5/2017 | Marco et al. |
| 2017/0153159 A1 | 6/2017 | Weller et al. |
| 2017/0160160 A1 | 6/2017 | Hugel |
| 2017/0176278 A1 | 6/2017 | Chen et al. |
| 2017/0188121 A1 | 6/2017 | Tan et al. |
| 2017/0191895 A1* | 7/2017 | Eckhardt ............... G01L 19/147 |
| 2017/0234752 A1 | 8/2017 | Potasek et al. |
| 2017/0247247 A1 | 8/2017 | Zhang et al. |

(56) References Cited

U.S. PATENT DOCUMENTS

| | | |
|---|---|---|
| 2017/0248537 A1 | 8/2017 | Serban et al. |
| 2017/0254766 A1 | 9/2017 | Bermudez Rodriguez et al. |
| 2017/0261453 A1 | 9/2017 | Dumitru et al. |
| 2017/0261457 A1 | 9/2017 | Suy et al. |
| 2017/0292890 A1 | 10/2017 | Liu et al. |
| 2017/0307457 A1 | 10/2017 | Zwijze et al. |
| 2017/0315009 A1 | 11/2017 | Riethmueller et al. |
| 2017/0315074 A1 | 11/2017 | Schwille |
| 2017/0315693 A1 | 11/2017 | Demuth et al. |
| 2017/0322099 A1 | 11/2017 | Pol |
| 2017/0328855 A1 | 11/2017 | Cobianu et al. |
| 2017/0350783 A1 | 12/2017 | Sixtensson et al. |
| 2017/0350846 A1 | 12/2017 | Cook et al. |
| 2017/0363492 A1 | 12/2017 | Chen et al. |
| 2017/0369306 A1 | 12/2017 | Bieselt |
| 2017/0370795 A1 | 12/2017 | Jones et al. |
| 2017/0370864 A1 | 12/2017 | Samarao et al. |
| 2017/0373475 A1 | 12/2017 | Boettcher et al. |
| 2018/0003584 A1 | 1/2018 | Danel et al. |
| 2018/0073950 A1 | 3/2018 | Bae et al. |
| 2018/0086626 A1 | 3/2018 | Le Neal et al. |
| 2018/0313709 A1 | 11/2018 | Chiou |
| 2019/0086283 A1 | 3/2019 | Wagner |

FOREIGN PATENT DOCUMENTS

| | | |
|---|---|---|
| CN | 103957498 B | 11/2017 |
| EP | 2136193 A2 | 12/2009 |
| EP | 3187848 A1 | 7/2017 |
| KR | 20150041843 A | 4/2015 |

OTHER PUBLICATIONS

"Pressure Switches—Reliable pressure control by means of on / off electrical switch," by Sensata Technologies; published on Mar. 12, 2018.

"Pressure Sensors—Best value solutions covering all sensing principles and pressure ranges," by Sensata Technologies; published on Mar. 12, 2018.

P1A Pressure Sensor, Copyright © 2018 Sensata Technologies, Inc.

2HMP Series—HVAC & Refrigeration Pressure Sensor, Copyright © 2018 Sensata Technologies, Inc.

* cited by examiner

PRESSURE SENSOR ASSEMBLY AND METHOD FOR MANUFACTURING A PRESSURE SENSOR ASSEMBLY

CROSS-REFERENCE TO RELATED APPLICATIONS

This application claims the benefit and priority of Chinese Patent Application No. 2018222134064, filed Dec. 27, 2018. The entire disclosure of the above application is incorporated herein by reference.

FIELD

The present disclosure relates to a sensor, and particularly to a pressure sensor assembly.

BACKGROUND

This section provides background information related to the present disclosure which is not necessarily prior art.

A pressure sensor is a device that converts pressure into a pneumatic or electric signal for control and remote transmission. The conventional pressure sensor, comprises pressure sensitive component and control circuit, etc. The pressure sensitive component is arranged in a connector, connecting to the control circuit disposed in a housing through a wire connection. In a conventional pressure sensor, the pressure sensitive component and the control circuit are designed to be separated from each other, so that the overall size or volume occupied by of the device is too large, and the reliability is poor.

SUMMARY

This section provides a general summary of the disclosure, and is not a comprehensive disclosure of its full scope or all of its features.

To solve the above problems, the present disclosure provides an improved pressure sensor assembly.

In one aspect of the disclosure, a pressure sensor assembly for detecting the pressure in an ambient environment includes a pressure responsive component comprising a pressure sensitive element and an output signal generator disposed on a common substrate. The output generator formats an output signal of the pressure sensitive element into a preset signal format.

In another aspect of the disclosure, the substrate has an aperture extending completely through the substrate and the pressure sensitive element is disposed on the substrate in communication with the aperture.

In another aspect of the disclosure, the pressure sensor assembly also includes a connector component comprising a body including a hollow, cylindrical portion at one end and a receiving cavity at a second, opposite end, wherein the receiving cavity is sized and shaped to accommodate the pressure responsive component, and wherein the pressure responsive component is disposed within the receiving cavity;

In another aspect of the disclosure, the pressure sensor assembly also includes a first seal for isolating the pressure responsive component from the ambient environment located around an interface between the pressure responsive component and the receiving cavity of the connector component;

In another aspect of the disclosure, the pressure sensor assembly also includes a housing component having a sensing end open to the ambient environment and in communication with the aperture in the substrate, and a second end comprising an open cylinder having a wall and defining a chamber. The pressure responsive component and the connector component are disposed in the chamber, and the wall of the chamber is crimped over the connector component.

In another aspect of the disclosure, the housing component includes a groove formed in a bottom portion the chamber.

In another aspect of the disclosure, the pressure sensor assembly also includes a seal ring disposed in the groove. The seal ring is compressed between the substrate of the pressure responsive component and the bottom portion the chamber of the housing to provide a second seal for isolating the pressure responsive component from the ambient environment.

In another aspect of the disclosure, the pressure sensor assembly also includes a third seal for isolating the pressure responsive component from the ambient environment. The third seal is optional in addition to or as an alternative to the second seal and is located around an interface between an edge of the crimped wall of the cylindrical chamber of the housing component and a perimeter of the body of the connector component.

In another aspect of the disclosure, the pressure sensitive element comprises a piezo-resistive device and the pressure sensitive element and the output signal generator are surface mounted to the substrate.

In another aspect of the disclosure, the substrate is a ceramic comprising one of an alumina ceramic and a zirconia ceramic.

In another aspect of the disclosure, the pressure responsive component further comprises a protective cover positioned on the substrate to cover at least one of the pressure sensitive element and the output signal generator.

In another aspect of the disclosure, the pressure sensor assembly also includes a sub-assembly comprising the pressure responsive component, the connector component and the first seal. In another aspect of the disclosure, the first seal comprises one of an epoxy and a silicone.

In another aspect of the disclosure, the body of the connector component further includes a threaded portion at the one end and a plurality of bosses protruding from the second end and located around a perimeter of the receiving cavity and the chamber comprises a ledge having a plurality of locator recesses disposed therein. Each of the locator recesses operatively engages a respective one of the plurality of bosses of the connector component to positively locate and position the pressure responsive component and/or the sub-assembly in the chamber.

In another aspect of the disclosure, the sensing end of the housing component further includes a hollow, tubular section open to the ambient environment and in communication with the aperture in the substrate.

In another aspect of the disclosure, a method for manufacturing the pressure sensor assembly is provided.

Through these and other aspects of the disclosure, a technical solution is provided in a pressure sensor assembly having a simpler construction, reduced and more compact size, and improved reliability over conventional pressure sensor assemblies.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
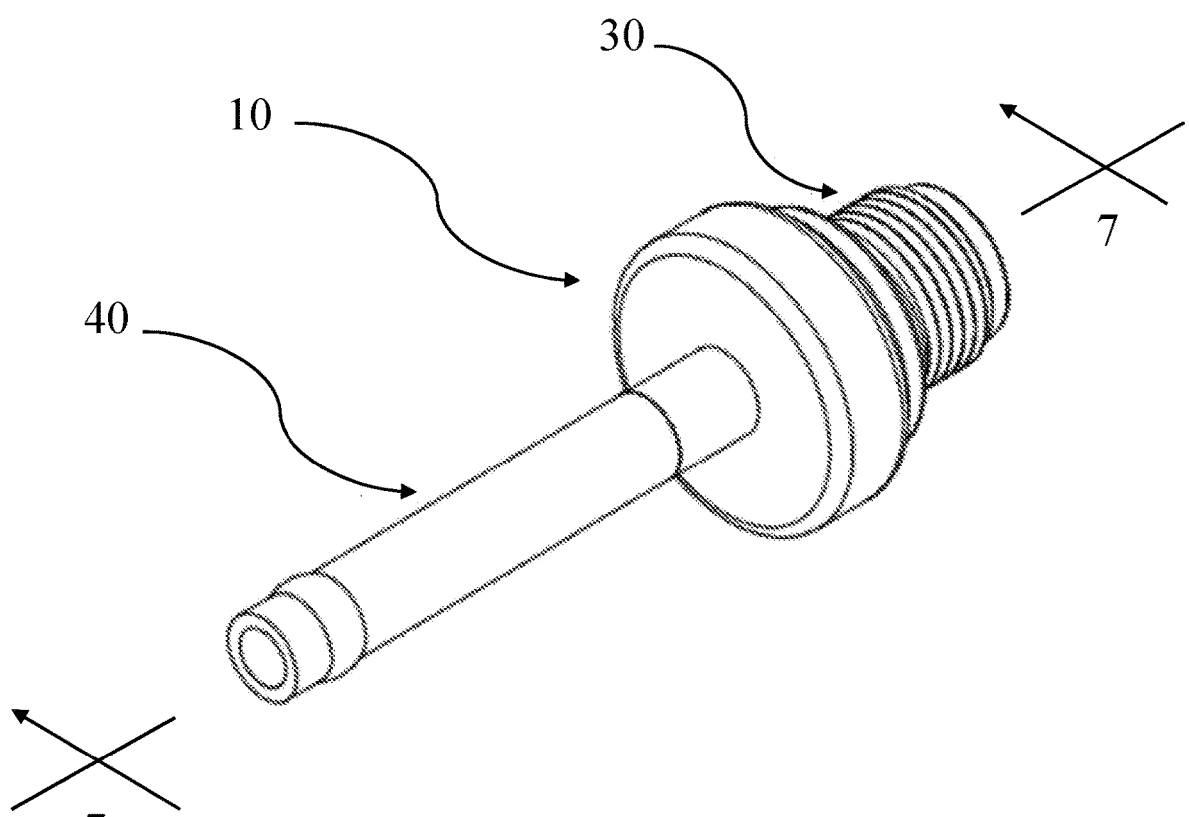
FIG. 1 is a schematic structural perspective view of an embodiment of a pressure sensor assembly of the present disclosure.
Figure 2:
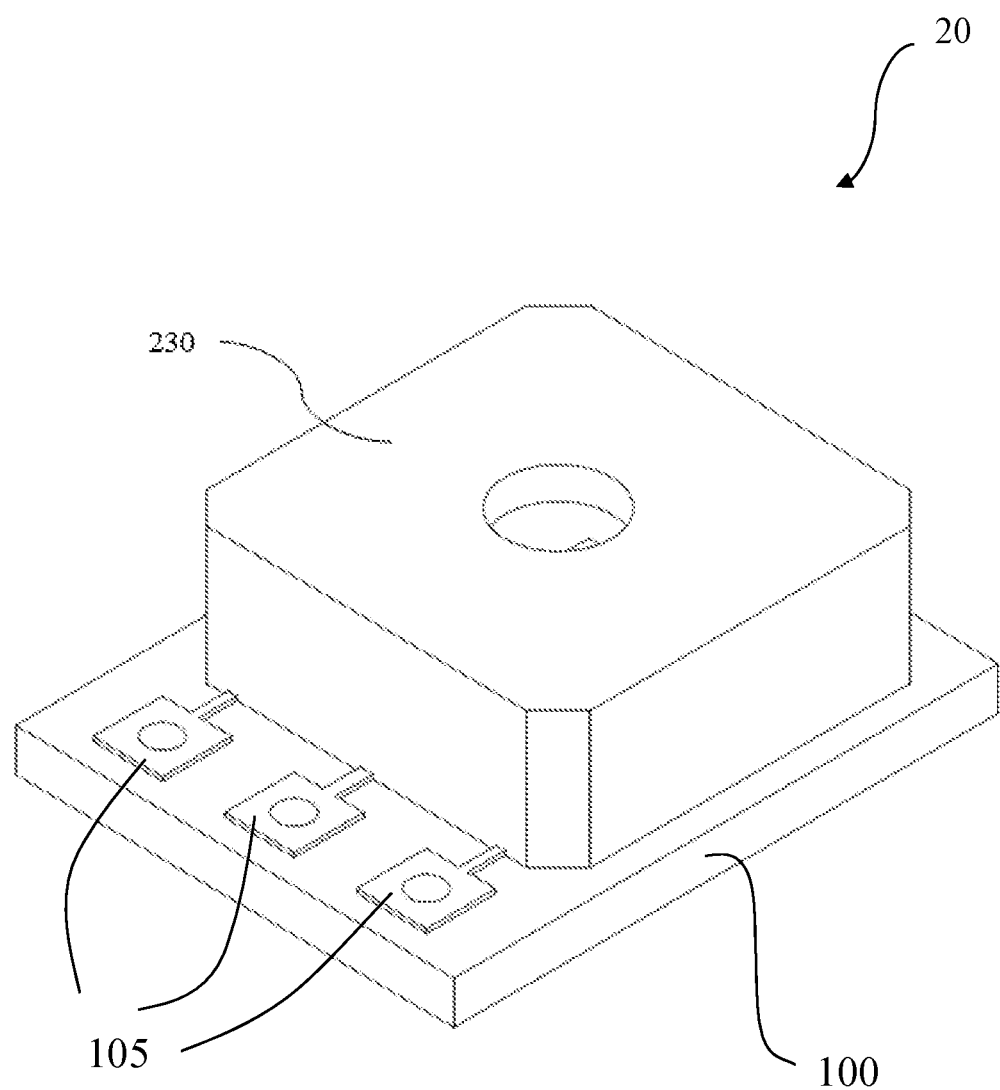
FIG. 2 is a schematic structural perspective view of an embodiment of a pressure responsive component including a protective cover of the pressure sensor assembly of the present disclosure.
Figure 4:
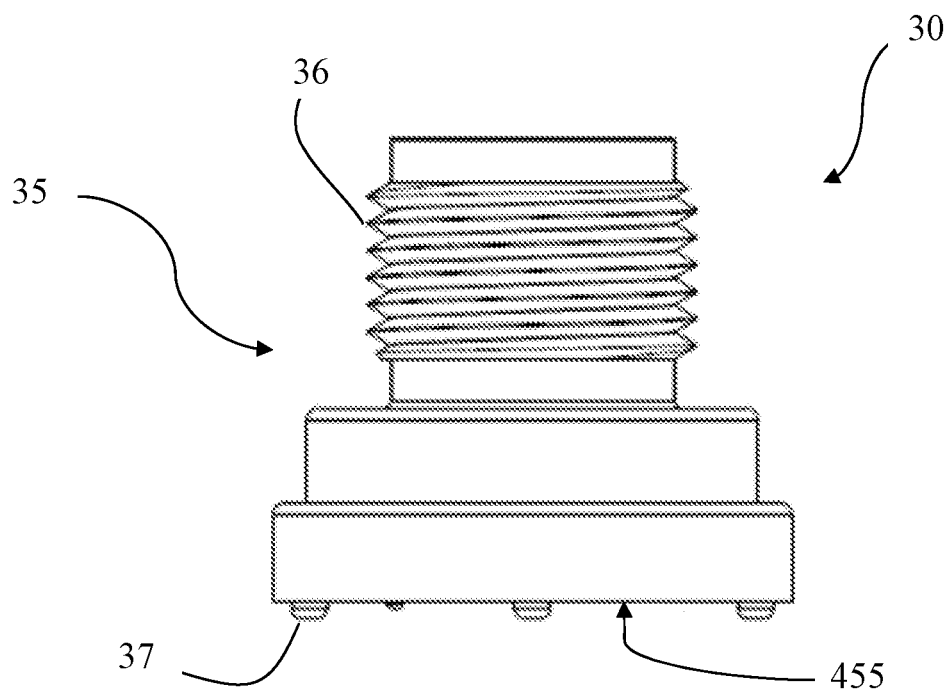
Figure 5:
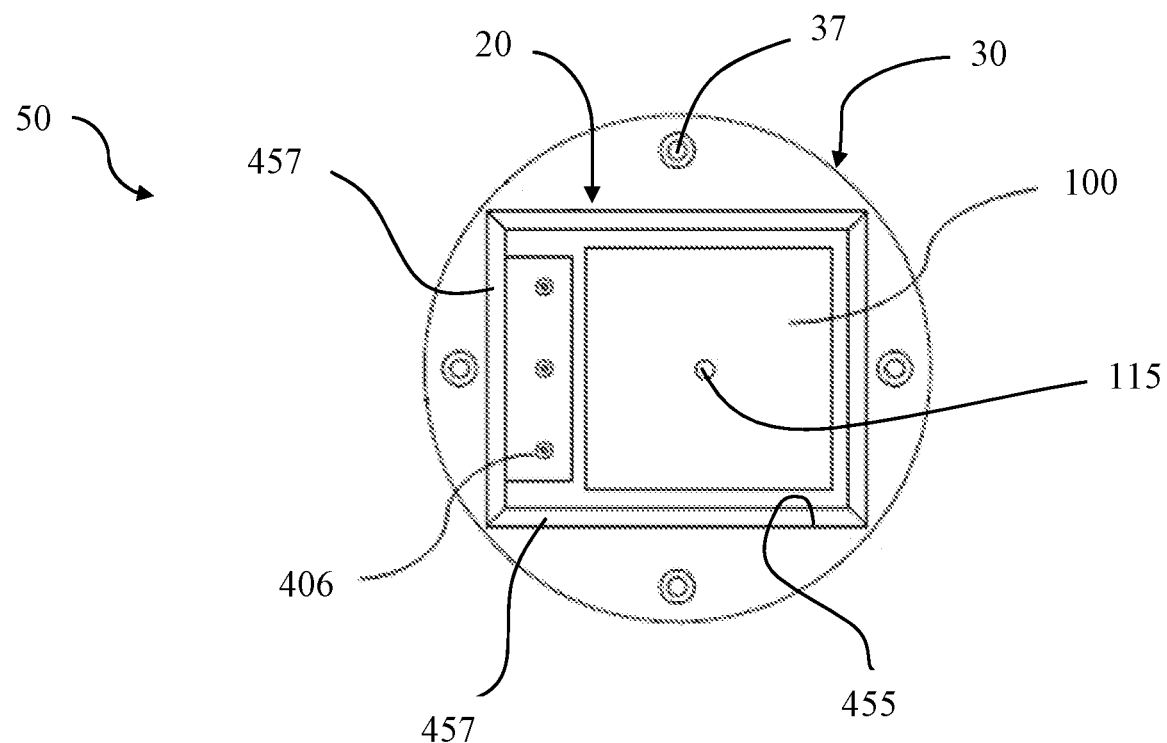
Figure 6:
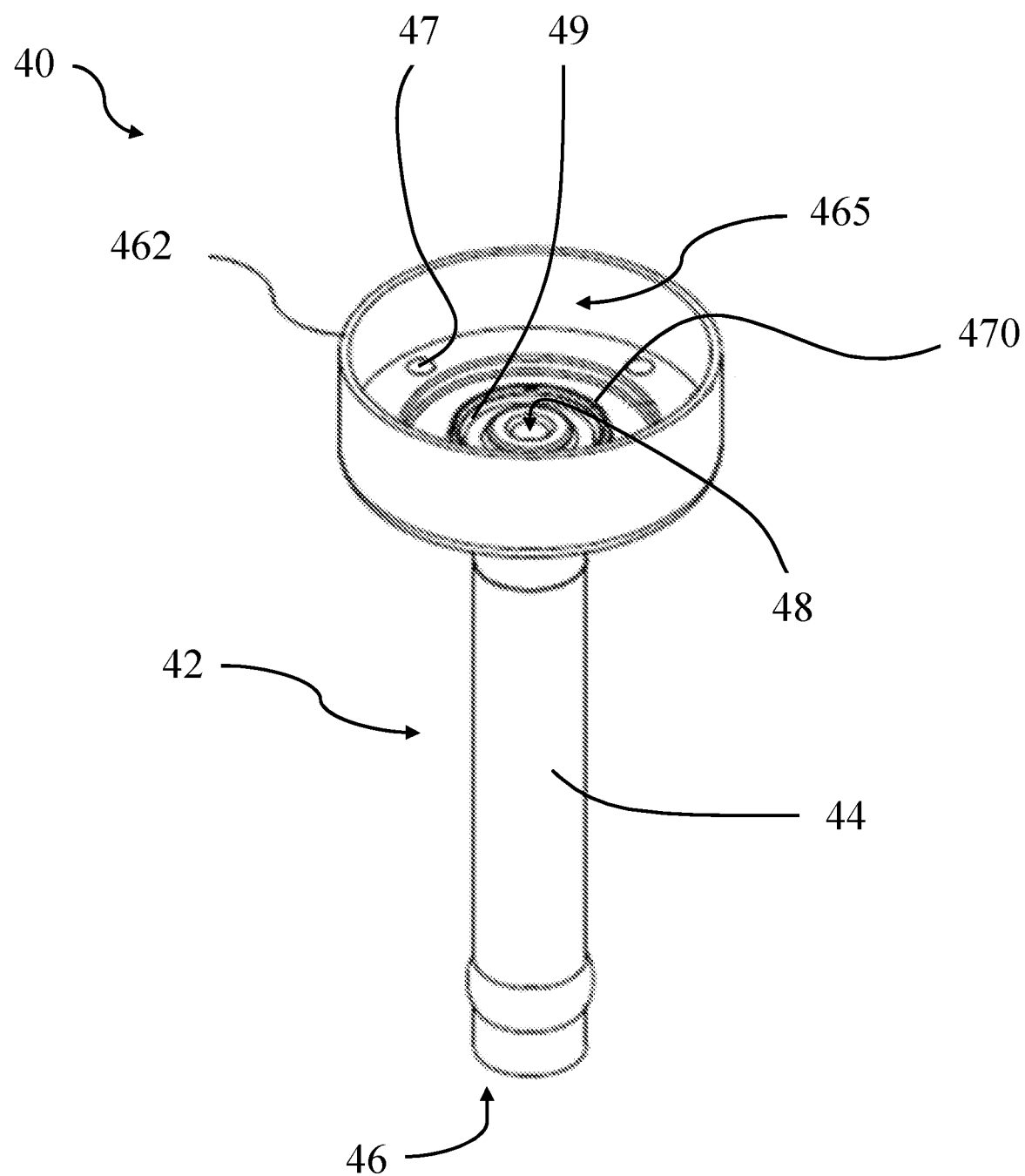
Figure 7:
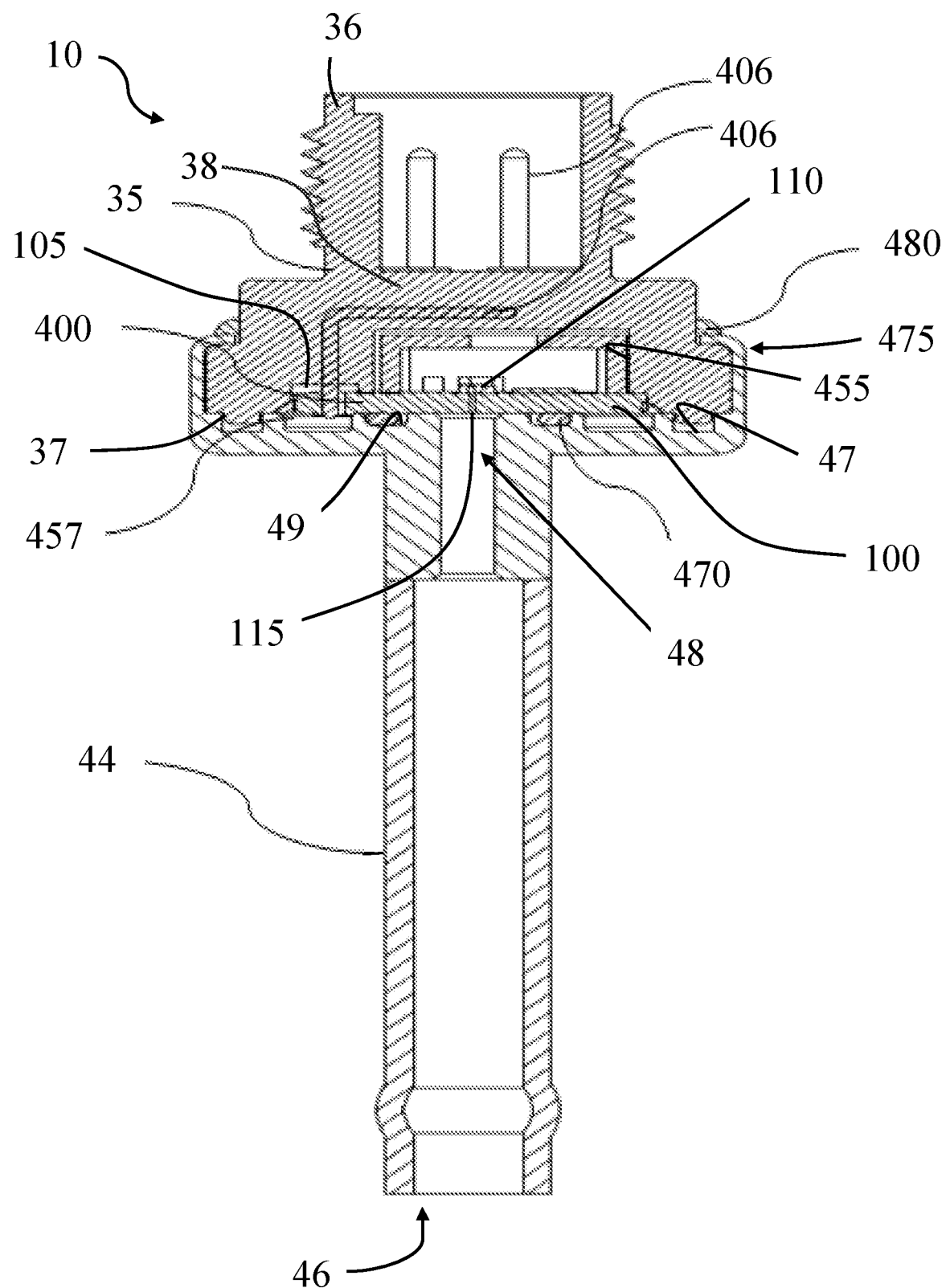

FIG. 4 is a schematic structural front view of an embodiment of a connector component of the pressure sensor assembly of the present disclosure FIG. 5 shows a schematic view of a sub-assembly of the pressure sensor assembly of the present disclosure including the connector component shown in FIG. 4 and the pressure responsive component shown in FIG. 2, as viewed from a bottom of the connector component;

FIG. 6 is a schematic structural view of an embodiment of a housing component of the pressure sensor assembly of the present disclosure in a pre-assembled state; and FIG. 7 is a schematic structural view showing an axial cross-section taken along the line 7-7 of the pressure sensor assembly of FIG. 1.

Corresponding reference numerals indicate corresponding parts throughout the several views of the drawings.

DETAILED DESCRIPTION

The following description is merely exemplary in nature and is not intended to limit the present disclosure, application or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The present disclosure provides a pressure sensor assembly 10. FIG. 1 shows a schematic structural perspective view of an embodiment of a pressure sensor assembly 10. A pressure sensor assembly 10, as shown in the FIGS., generally includes a pressure responsive component 20 (best seen in FIGS. 2, 3, 5 and 7), a connector component 30 (best seen in FIGS. 1, 4 and 7) and a housing component 40 (best seen in FIGS. 1, 6 and 7). The pressure responsive component 20 and connector component 30 are assembled together to form a sub-assembly 50 (FIG. 5) of the pressure sensor assembly 10, as further described herein. The sub-assembly 50 is then assembled with the housing 40 to form the pressure sensor assembly 10, as further described herein.

Through the technical solution of the present disclosure, the manufacturing and assembly process for the pressure sensor assembly are simplified and the size of the pressure sensor assembly is minimized to become more compact than conventional designs. The pressure sensor assembly is more efficient and the integrated arrangement also improves the reliability of the device.

Figure 3:
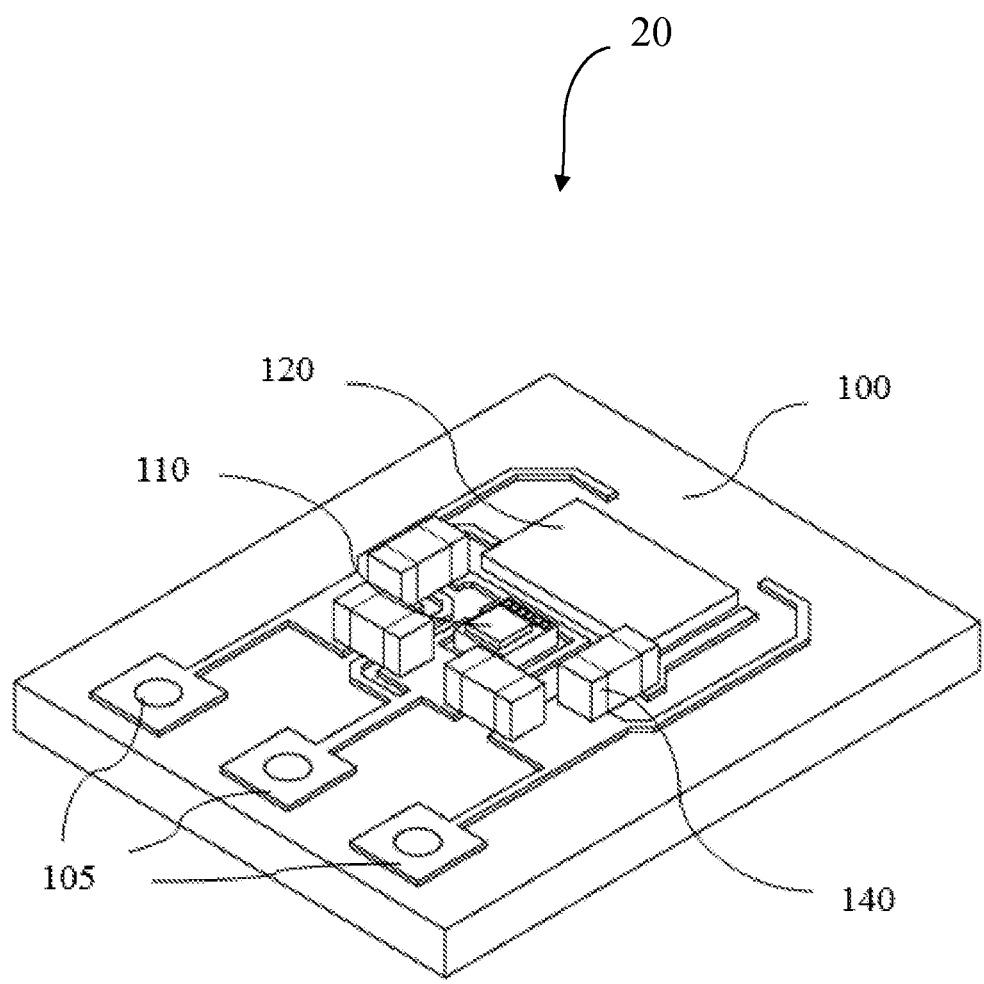
FIG. 3 is a schematic structural perspective view of the pressure responsive component of FIG. 2 with the protective cover removed.

Referring now to FIGS. 2 and 3, the pressure responsive component 20 includes a circuit having a pressure sensitive MEMS element 110, which can be a silicon, piezo-resistive device and an output signal generator, which can be a signal modulation module or ASIC 120, configured to produce and/or modulate an output signal of the pressure sensitive element 110 into a preset signal format indicative of the pressure of the ambient environment in which the pressure sensor assembly is located.

The pressure sensitive element 110 and the signal modulation module 120 can be integrated onto a substrate (e.g., base board) 100. Through the technical solution provided in the present disclosure, the pressure sensitive element 110 and the signal modulation module 120 can be combined or integrated into a single independent pressure responsive component 20 by using an integrated manner, so that the pressure responsive component 20 is simpler to use and to be installed. The overall volume (size) of the pressure responsive component 20 is smaller and more compact, and the reliability is improved.

As a preferred aspect of the disclosure, the pressure sensitive element 110 and the signal modulation module 120 may be arranged directly on the substrate 100 by surface mounting. By this technical solution, wire connection is unnecessary, the volume of the pressure sensor is reduced, and overall size is smaller and more compact than conventional devices.

As another preferred aspect of the disclosure, the pressure sensitive element 110 connects with the signal modulation module 120 by bonding wire; or, the pressure sensitive element 110 connects with the signal modulation module 120 by the printed circuit on the substrate. In this embodiment, the pressure sensitive element 110 and the signal modulation module 120 are electrically connected to each other by bonding wire or by the printed circuit on the substrate, so that any wiring or wired connections between the pressure sensitive element 110 and the signal modulation module 120 are eliminated, the production and processing for this product are convenient, and it is easy to implement.

As another preferred aspect of the disclosure, the substrate 100 comprises a ceramic substrate. In this aspect of the disclosure, using the ceramic substrate, the mechanical strength and the insulation performance of the pressure responsive component 20 provided in this present disclosure are improved over conventional devices. Compared with the glass fiber substrate in the conventional device, the mechanical strength of the ceramic substrate is better, the insulation performance is better, the material properties are more stable, and the corrosion resistance is better. Furthermore, in the case of that the pressure sensor assembly need to be directly contacted with the working medium, especially for the liquid working medium, the adaptation range is wider. The ceramic substrate does not need to be physically isolated from the working medium, so the pressure sensor assembly design and method for making the pressure sensor assembly is simplified.

Preferably, the ceramic substrate comprises an alumina ceramic substrate or a zirconia ceramic substrate. According to this embodiment, the conductivity, mechanical strength, and high temperature resistance of the substrate of the pressure sensor assembly are improved.

As best seen in FIGS. 5 and 7, the substrate 100 includes a small aperture 115 extending completely through the substrate 100. The pressure sensitive element 110 is disposed on the substrate 110 in communication with the aperture 115 (i.e., physical communication, not electrical communication). For example, the pressure sensitive element 110 can be located directly over the aperture 115. As discussed further, the aperture 115 enables the pressure sensitive element 110 to be exposed to the ambient environment in which the pressure sensor assembly 10 is disposed during use.

As another preferred aspect of the disclosure, the pressure responsive component 20, as shown in FIG. 2, can further include a protective cover 230 arranged on the substrate 100, configured to protect the signal modulation module 120, and/or the pressure sensitive element 110. In this aspect of the disclosure, the protective cover 230 arranged on the substrate 100 covers the signal modulation module 120, and/or the pressure sensitive element 110, so that the components inside the protective cover 230 will be not easily impacted or otherwise disturbed by using of the pressure sensor assembly 10, which is safer and more reliable for the pressure sensor assembly 10 and components covered by the protective cover 230.

With reference to FIG. 3, as another preferred aspect of the disclosure, the pressure sensor assembly 10 and pressure responsive component 20 described above can further include a load 140, configured in the circuit of the signal modulation module 120 and the pressure sensitive element 110. The load 140 can include passive components, such as resistors and capacitors, etc. These passive components can also be arranged on the substrate 100 and electrically connected to the signal modulation module 120 and the pressure sensitive element 110. By this technical solution, the signal modulation module 120 and the pressure sensitive element 110 can receive current protection, and the safety is improved.

FIG. 4 shows a schematic structural view of an embodiment of a connector component 30 of the pressure sensor assembly 10 provided in the present disclosure. Also, as best seen in FIG. 7, the connector component 30 has a body 35 that includes a hollow, cylindrical threaded portion 36 at one end and a receiving cavity 455 at a second, opposite end. At the second end of the body 35 and around a perimeter of the receiving cavity 455, the connector component 30 includes a plurality of locator bosses 37 protruding from the second end. The receiving cavity 455 is sized and shaped to accommodate placement of the pressure responsive component 20, which can be disposed and located within the receiving cavity 455.

As a preferred aspect of the disclosure, when the pressure sensor assembly 10 is assembled, the pressure responsive component 20 is positioned between the connector component 30 and the housing component 40. FIG. 5 shows a sub-assembly 50 of the pressure sensor assembly 10 including the pressure responsive component 20 disposed in the receiving cavity 455 of the connector component 30. FIG. 5 shows the view of the sub-assembly 50 in the direction of the second end of the connector component 30. A sealing material (e.g., an epoxy, silicone or other known material) is disposed around a perimeter of the receiving cavity 455 to create a first seal or environmental barrier 457 at the interface between the pressure responsive component 20 and the connector component 30 for separating or isolating the pressure responsive component 20 from the ambient environment. Further, the pressure responsive component 20 can thereby be integrally enclosed within the connector component 30 to form the sub-assembly 50 so that the structure and construction of the pressure sensor assembly 10 is simpler and more compact, and the reliability performance of the pressure sensor assembly 10 is improved.

The pressure sensor assembly of the present disclosure also includes a housing component 40. With reference to FIG. 6, a schematic structural view of an embodiment of the housing component 40 in a pre-assembled condition is shown.

The housing component 40 includes a first end or sensing end 42 comprising a hollow, tubular section 44 which is open to the ambient environment in which the pressure sensor assembly 10 is to be employed at one end 46. The opposite end 48 of sensing end 42 of the housing component 40 is also in communication with the aperture 115 in the substrate 100 of the pressure responsive component 20. In this manner, the pressure sensitive element 110 is exposed to the ambient environment.

A second end of the housing component 40 includes an open cylinder section having a wall with an edge 462 and defining a chamber 465. The cylindrical chamber 465 accommodates or receives the sub-assembly 50 of the pressure sensor assembly 10 prior to final assembly of the pressure sensor assembly 10. As best seen in FIGS. 6 and 7, locator recesses 47 are disposed in a ledge of the cylindrical chamber 465 at several positions around the cylindrical chamber 465. The locator recesses 47 are configured to and operatively engage the locator bosses 37 of the connector component 30 to positively locate and position the sub-assembly 50 in the cylindrical chamber 465 of the housing component 40 during further assembly of the pressure sensor assembly 10.

FIG. 7 is a schematic structural view of an axial cross-section of an embodiment of the pressure sensor assembly 10 of the present disclosure taken along line 7-7 of FIG. 1. FIG. 7 shows the pressure sensor assembly 10 in its fully-assembled condition. As shown, terminals or leads 406 to the pressure responsive component 20 can be arranged so as to extend through an intermediate wall 38 of the connector component 30, from the receiving cavity 455 to the hollow threaded portion 36. Also as shown, the sub-assembly 50 is installed in the cylindrical chamber 465 of the housing component 40. The wall of the cylindrical chamber 465 (e.g., at the edge 462) is folded, bent or crimped over a perimeter of the body 35 the connector component 30 (see, 475 of FIG. 7) to retain the sub-assembly 50 in the housing component 40.

As another preferred aspect of the present disclosure, and with reference to FIGS. 6 and 7, the pressure sensor assembly 10 further includes multiple seal structures to isolate the pressure responsive component 20 within the housing component 40. In addition to the first seal 457 in the sub-assembly 50 at the interface between the pressure responsive component 20 and the connector component 30, a sealing ring 470, for example, an o-ring, can be arranged between the housing 40 and the sub-assembly 50, e.g., at the substrate 100 the pressure responsive component 20 to form a second seal. As shown in a preferred aspect of the disclosure of FIG. 7, the sealing ring 470 engages in sealing contact with the housing component 40. In this respect, the sealing ring 470 is arranged or disposed in an accommodating groove 49 formed in a base or bottom portion of the cylindrical chamber 465 of the housing component 40. In the completed pressure sensor assembly 10 as shown, the sealing ring 470 is compressively sealed (i.e., pressed and sealed) between the housing component 40 and the pressure responsive component 20 to form the second seal.

Still further, a sealing material can be applied over the edge 462 of the crimped wall of the cylindrical chamber 465 of the housing component 40 and a perimeter of the body 35 of the connector component 30 to create a third seal 480, in addition to, or alternatively to, the sealing ring 470.

Consequently, with the first seal 457 in the sub-assembly 50, the sealing ring 470 in the receiving chamber 465 of the housing component 40 and/or the third seal 480 at the crimped edge 462 of the housing component 40, the pressure responsive component 20 is integrally enclosed inside the housing component 40 so that the sealing performance of the pressure sensor assembly 10 is increased, improving the reliability of the device.

The assembly process for the pressure sensor assembly 10 will be described in detail with reference to FIGS. 1 to 7. In an assembly process of a preferred aspect of the disclosure, the pressure responsive component 20 can first be disposed in the receiving cavity 455 of the connector component 30 such that the perimeter of the substrate 100 is fit in close proximity to the corresponding perimeter of the receiving cavity 455. Terminals (or leads) 406 can then be connected (such as by solder) to the contacts 105 on the substrate 100 of the pressure responsive component 20. Thereafter, a sealing material can be applied at the perimeter of both the substrate 100 of the pressure responsive component 20 and the receiving cavity 455 to provide a first seal 457 to help isolate the pressure responsive component 20 from the ambient environment and to integrate the pressure responsive component 20 with the connector component 30 into a sub-assembly 50 as shown in FIG. 5 and.

Then a sealing ring 470 can be disposed in a groove 49 located in the bottom portion of the cylindrical chamber 465 of the housing component 40. The sub-assembly 50 (i.e., the connector component 30 integrated with the pressure responsive component 20) can then be placed within the cylindrical chamber 465 of the housing component 40 such that the pressure responsive component 20 is positioned adjacent to or against the sealing ring 470. Thereafter, the wall of the cylindrical chamber 465 (e.g., at the edge 462) is folded, bent or crimped over a perimeter of the body 35 of the connector component 30 (see, 475 of FIG. 7) to retain the sub-assembly 50 in the housing component 40 and integrally enclose the pressure responsive component 20 within the cylindrical chamber 465 of the housing component 40. In this way, the sealing ring 470 is compressed between the pressure responsive component (e.g., against the substrate) and the housing component 40 (e.g., against the groove 49 in the bottom portion of the cylindrical chamber 465) and a second seal for separating or isolating the pressure responsive component 20 from the ambient environment is provided by the sealing ring 470. Finally, a sealing material can be applied over the edge 462 of the crimped wall of the cylindrical chamber 465 of the housing component 40 joining the sub-assembly 50 (i.e., at the crimp 475 of the housing component 40 over the sub-assembly 50 at an interface between the edge 462 and a perimeter of the body 35 of the connector component 30). The sealing material provides an optional third seal 480 or an alternative second seal of the pressure responsive component 20 from the ambient environment.

Through the above embodiments, a pressure sensor assembly 10 is provided. Through this technical solution, the following technical effects are achieved: the pressure sensitive element 110 and the signal modulation module 120 are integrated into a single independent pressure responsive component 20, so that the pressure responsive component 20 is simpler to install and to use; and the overall volume is smaller and compact, the product reliability is improved; since that integrating into an independent pressure responsive component, the position of the parts inside the pressure responsive component 20 is also relatively fixed, avoiding the use of parts which are not fixed such as flexible printed circuit boards and insulated wires; and moreover, in this embodiment, the pressure sensor doesn't need to be physically isolated from the working medium, in the case of that the pressure sensor is applied to pressure transmitters compared to conventional solutions, which simplifies the design and process.

It should be noted that these technical effects are not obtained by all above embodiments, and some technical effects are obtained only by some preferred embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the term "module" may refer to, be part of, or include: an Application Specific Integrated Circuit (ASIC); a digital, analog, or integrated analog/digital discrete circuit; a digital, analog, or integrated analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

What is claimed is:

1. A pressure sensor assembly for detecting the pressure in an ambient environment, comprising:
    a pressure responsive component comprising a pressure sensitive element and an output signal generator disposed on a common substrate, wherein the output signal generator formats an output signal of the pressure sensitive element into a preset signal format, wherein the substrate comprises an aperture extending completely through the substrate and wherein the pressure sensitive element is disposed on the substrate in communication with the aperture;
    a connector component comprising a body including a hollow, cylindrical portion at one end and a receiving cavity at a second, opposite end, wherein the receiving cavity is sized and shaped to accommodate the pressure responsive component, and wherein the pressure responsive component is disposed within the receiving cavity;
    a first seal for isolating the pressure responsive component from the ambient environment located around an interface between the pressure responsive component and the receiving cavity of the connector component;
    a housing component comprising a sensing end open to the ambient environment and in communication with the aperture in the substrate, and a second end comprising an open cylinder having a wall and defining a chamber, wherein the pressure responsive component and the connector component are disposed in the chamber, wherein the wall of the chamber is crimped over the connector component, wherein a groove is formed in a bottom portion of the chamber;
    a seal ring disposed in the groove, wherein the seal ring is compressed between the substrate of the pressure responsive component and the bottom portion of the chamber of the housing component to provide a second seal for isolating the pressure responsive component from the ambient environment; and
    a third seal for isolating the pressure responsive component from the ambient environment located around an interface between an edge of the crimped wall of the cylindrical chamber of the housing component and a perimeter of the body of the connector component.

2. The pressure sensor assembly of claim 1 wherein the pressure sensitive element comprises a piezo-resistive device;
    wherein the pressure sensitive element and the output signal generator are surface mounted to the substrate; and
    wherein the substrate is a ceramic comprising one of an alumina ceramic and a zirconia ceramic.

3. The pressure sensor assembly of claim 2, wherein the pressure responsive component further comprises a protective cover positioned on the substrate to cover at least one of the pressure sensitive element and the output signal generator.

4. The pressure sensor assembly of claim 3, further comprising a sub-assembly comprising the pressure responsive component, the connector component and the first seal;
    wherein the first seal comprises one of an epoxy and a silicone.

5. The pressure sensor assembly of claim 4, wherein the body of the connector component further comprises a threaded portion at the one end and a plurality of bosses protruding from the second end and located around a perimeter of the receiving cavity.

6. The pressure sensor assembly of claim 5, wherein the chamber comprises a ledge having a plurality of locator recesses disposed therein;
    wherein each of the locator recesses operatively engages a respective one of the plurality of bosses of the connector component to positively locate and position the sub-assembly in the chamber.

7. The pressure sensor assembly of claim 2, wherein the sensing end of the housing component further comprises a hollow, tubular section open to the ambient environment and in communication with the aperture in the substrate.

8. The pressure sensor assembly of claim 7, further comprising a sub-assembly comprising the pressure responsive component, the connector component and the first seal;
    wherein the pressure responsive component further comprises a protective cover positioned on the substrate to cover at least one of the pressure sensitive element and the output signal generator; and
    wherein the first seal comprises one of an epoxy and a silicone.

9. The pressure sensor assembly of claim 8, wherein the body of the connector component further comprises a threaded portion at the one end and a plurality of bosses protruding from the second end and located around a perimeter of the receiving cavity.

10. The pressure sensor assembly of claim 9, wherein the chamber comprises a ledge having a plurality of locator recesses disposed therein;
    wherein each of the locator recesses operatively engages a respective one of the plurality of bosses of the connector component to positively locate and position the sub-assembly in the chamber.

11. The pressure sensor assembly of claim 10 wherein one of the first seal and the third seal comprises one of an epoxy and a silicone.

12. A method for manufacturing the pressure sensor assembly for detecting the pressure in an ambient environment of claim 1, comprising the steps of:
    disposing the pressure responsive component in the receiving cavity such that a perimeter of the substrate is fit in close proximity to a perimeter of the receiving cavity;
    attaching leads to contacts on the substrate of the pressure responsive component;
    applying a sealing material at the perimeter of both the substrate of the pressure responsive component and the receiving cavity to create the first seal to separate the pressure responsive component from the ambient environment and to integrate the pressure responsive component with the connector component into a sub-assembly;
    disposing the seal ring in the groove located in the bottom portion of the cylindrical chamber of the housing component;

disposing the sub-assembly within the cylindrical chamber of the housing component such that the pressure responsive component is positioned adjacent to the sealing ring;

crimping the wall of the cylindrical chamber over a perimeter of the body of the connector component to retain the sub-assembly and integrally enclose the pressure responsive component within the cylindrical chamber of the housing component and compress the seal ring between the pressure responsive component and the housing component to create the second seal to separate the pressure responsive component from the ambient environment;

applying a sealing material over the crimped wall of the housing component along the perimeter of the body of the connector component to create the third seal to separate the pressure responsive component from the ambient environment.

13. A pressure sensor assembly for detecting the pressure in an ambient environment, comprising:

a pressure responsive component comprising a pressure sensitive element and an output signal generator disposed on a common substrate, wherein the output signal generator formats an output signal of the pressure sensitive element into a preset signal format, wherein the substrate comprises an aperture extending completely through the substrate and wherein the pressure sensitive element is disposed on the substrate in communication with the aperture;

a connector component comprising a body including a hollow, cylindrical portion at one end and a receiving cavity at a second, opposite end, wherein the receiving cavity is sized and shaped to accommodate the pressure responsive component, and wherein the pressure responsive component is disposed within the receiving cavity;

a first seal for isolating the pressure responsive component from the ambient environment located around an interface between the pressure responsive component and the receiving cavity of the connector component;

a housing component comprising a sensing end open to the ambient environment and in communication with the aperture in the substrate, and a second end comprising an open cylinder having a wall and defining a chamber, wherein the pressure responsive component and the connector component are disposed in the chamber, wherein the wall of the chamber is crimped over the connector component, wherein a groove is formed in a bottom portion of the chamber; and a seal ring disposed in the groove, wherein the seal ring is compressed between the substrate of the pressure responsive component and the bottom portion of the chamber of the housing component to provide a second seal for isolating the pressure responsive component from the ambient environment.

14. The pressure sensor assembly of claim 13, further comprising a third seal for isolating the pressure responsive component from the ambient environment located around an interface between an edge of the crimped wall of the cylindrical chamber of the housing component and a perimeter of the body of the connector component.

15. The pressure sensor assembly of claim 13 wherein the pressure sensitive element comprises a piezo-resistive device;

wherein the pressure sensitive element and the output signal generator are surface mounted to the substrate; and wherein the substrate is a ceramic comprising one of an alumina ceramic and a zirconia ceramic.

16. The pressure sensor assembly of claim 15, wherein the pressure responsive component further comprises a protective cover positioned on the substrate to cover at least one of the pressure sensitive element and the output signal generator.

17. The pressure sensor assembly of claim 16, further comprising a sub-assembly comprising the pressure responsive component, the connector component and the first seal; and wherein the first seal comprises one of an epoxy and a silicone.

18. The pressure sensor assembly of claim 15, wherein the sensing end of the housing component further comprises a hollow, tubular section open to the ambient environment and in communication with the aperture in the substrate.

19. A method for manufacturing the pressure sensor assembly for detecting the pressure in an ambient environment of claim 13, comprising the steps of:

disposing the pressure responsive component in the receiving cavity such that a perimeter of the substrate is fit in close proximity to a perimeter of the receiving cavity;

attaching leads to contacts on the substrate of the pressure responsive component;

applying a sealing material at the perimeter of both the substrate of the pressure responsive component and the receiving cavity to create the first seal to separate the pressure responsive component from the ambient environment and to integrate the pressure responsive component with the connector component into a sub-assembly;

disposing the seal ring in the groove located in the bottom portion of the cylindrical chamber of the housing component;

disposing the sub-assembly within the cylindrical chamber of the housing component such that the pressure responsive component is positioned adjacent to the seal ring; and crimping the wall of the cylindrical chamber over a perimeter of the body of the connector component to retain the sub-assembly and integrally enclose the pressure responsive component within the cylindrical chamber of the housing component and compress the seal ring between the pressure responsive component and the housing component to create the second seal to separate the pressure responsive component from the ambient environment.

* * * * *